United States Patent
Lee et al.

(10) Patent No.: US 9,083,678 B2
(45) Date of Patent: Jul. 14, 2015

(54) FIREWALL POLICY INSPECTION APPARATUS AND METHOD

(71) Applicant: ELECTRONICS AND TELECOMMUNICATIONS RESEARCH INSTITUTE, Daejeon (KR)

(72) Inventors: Jae-Sung Lee, Daejeon (KR); Jung-Min Kang, Daejeon (KR); Byung-Chul Bae, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 130 days.

(21) Appl. No.: 13/946,852

(22) Filed: Jul. 19, 2013

(65) Prior Publication Data

US 2014/0157356 A1    Jun. 5, 2014

(30) Foreign Application Priority Data

Nov. 30, 2012 (KR) .................. 10-2012-0138419

(51) Int. Cl.
H04L 29/06    (2006.01)

(52) U.S. Cl.
CPC ........ *H04L 63/0263* (2013.01); *H04L 63/1433* (2013.01); *H04L 63/0227* (2013.01); *H04L 63/1466* (2013.01)

(58) Field of Classification Search
None
See application file for complete search history.

(56) References Cited

U.S. PATENT DOCUMENTS

| | | | | |
|---|---|---|---|---|
| 7,849,497 | B1 * | 12/2010 | Hurst et al. | 726/1 |
| 2006/0195896 | A1 * | 8/2006 | Fulp et al. | 726/11 |
| 2008/0301765 | A1 * | 12/2008 | Nicol et al. | 726/1 |
| 2009/0158386 | A1 | 6/2009 | Lee | |

FOREIGN PATENT DOCUMENTS

| | | |
|---|---|---|
| KR | 10-2006-0058179 A | 5/2006 |
| KR | 10-2009-0065423 A | 6/2009 |

OTHER PUBLICATIONS

Al-Shaer et al., Firewall Policy Advisor for Anomaly Discovery and Rule Editing, 2003, Springer Science+Business Media Dordrecht, pp. 18-30.*
Chi-Shih Chao, A Visualized Firewall Rule Validation System, 2007, Springer-Verlag Berlin Heidelberg, APNOMS 2007, LNCS 4773, pp. 364-374.*
Hongxing Hu et al. FAME: A Firewall Anomaly Management Environment, 2010, ACM 978-1-45030093-3/10/10, SafeConfig'10,Oct. 4, 2010, Chicago, Illinois, USA.*
Dong-Hoon Lee, "A Study on the Detection Method of Anomaly Rules Model for the Optimization of Firewall Policy," thesis of Dept. Of Information Security the Graduate School of Information & Communication Sungkyunkwan University, 2011 X.

* cited by examiner

*Primary Examiner* — Jung Kim
*Assistant Examiner* — Adrian Stoica
(74) *Attorney, Agent, or Firm* — LRK Patent Law Firm (57) ABSTRACT

A firewall policy inspection apparatus and method is provided. The firewall policy inspection apparatus includes an intrusion prevention rule obtainment unit for obtaining intrusion prevention rules from a target firewall policy. An anomaly rule detection unit detects an anomaly rule in a relationship between the intrusion prevention rules. A screen display unit displays an anomaly rule graph on a screen using results of the detection.

12 Claims, 5 Drawing Sheets

| | SEQUENCE | PROTOCOL | SOURCE IP | SOURCE PORT | DESTINATION IP | DESTINATION PORT | ACTION |
|---|---|---|---|---|---|---|---|
| SHADOWING ANOMALY | FIRST RULE | TCP | *.*.*.* | ANY | 140.192.37.40 | 80 | ACCEPT |
| | SECOND RULE | TCP | 140.192.37.* | ANY | 140.192.37.40 | 80 | DENY |
| REDUNDANCY ANOMALY | FIRST RULE | TCP | 140.192.37.* | ANY | *.*.*.* | 80 | ACCEPT |
| | SECOND RULE | TCP | 140.192.37.* | ANY | 161.120.33.40 | 80 | ACCEPT |
| CORRELATION ANOMALY | FIRST RULE | TCP | 140.192.37.20 | ANY | *.*.*.* | 80 | DENY |
| | SECOND RULE | TCP | *.*.*.* | ANY | 161.120.33.40 | 80 | ACCEPT |
| GENERALIZATION ANOMALY | FIRST RULE | TCP | 140.192.37.20 | ANY | *.*.*.* | 80 | DENY |
| | SECOND RULE | TCP | *.*.*.* | ANY | *.*.*.* | 80 | ACCEPT |

FIREWALL POLICY INSPECTION APPARATUS AND METHOD

CROSS REFERENCE TO RELATED APPLICATION

This application claims the benefit of Korean Patent Application No. 10-2012-0138419, filed on Nov. 30, 2012, which is hereby incorporated by reference in its entirety into this application.

BACKGROUND OF THE INVENTION

1. Technical Field

The present invention relates generally to a firewall policy inspection apparatus and method and, more particularly, to a firewall policy inspection apparatus and method, which detect an anomaly rule in relationships between intrusion prevention rules and display the anomaly rule on a screen.

2. Description of the Related Art

Just as a firewall functions to block a fire so that the fire does not spread to a surrounding area when a fire breaks out in a building, so a firewall in a computer network is installed in the first stage of the network and functions to prevent security faults and threats on the Internet from spreading to surrounding networks or personal computers. It is able to perform this function because, when rules for controlling packets are set in a firewall policy and operated, the firewall is based on the principle of a packet filtering function that allows only permitted packets to flow into the corresponding network in conformity with the set policy.

However, as the number of rules for a firewall policy set by a manger increases, an anomaly rule may occur between the rules. The manual detection of an anomaly rule by the manager not only may require a lot of effort and much time, but also may result in errors, even in management. This may lead to a deterioration of performance of the firewall and the occurrence of vulnerabilities in security, thus causing problems in the network.

Korean Patent Application Publication No. 2009-0065423 presents technology for detecting an anomaly rule related to new intrusion prevention rules in a firewall policy. Further, Korean Patent Application Publication No. 2006-0058179 presents technology for providing information about the generation of new intrusion prevention rules in a firewall policy.

However, the conventional technologies neither disclose in detail a configuration for detecting an anomaly rule as any one of a shadowing anomaly, a redundancy anomaly, a correlation anomaly, and a generalization anomaly in relationships between intrusion prevention rules, nor introduce technology for indicating the anomaly rule in the colors of figures preset depending on the level of risk to more easily inspect intrusion prevention rules in a firewall policy.

Therefore, new firewall policy inspection technology is urgently required which can detect an anomaly rule in relationships between intrusion prevention rules and display the detected anomaly rule on a screen, and can detect the anomaly rule as one of a shadowing anomaly, a redundancy anomaly, a correlation anomaly, and a generalization anomaly in the relationships between the intrusion prevention rules, and which can indicate the anomaly rule in the colors of figures preset depending on the level of risk, and can display intrusion prevention rules other than the anomaly rule on the screen and allow the intrusion prevention rules in a firewall policy to be more easily inspected.

SUMMARY OF THE INVENTION

Accordingly, the present invention has been made keeping in mind the above problems occurring in the prior art, and an object of the present invention is to detect an anomaly rule in relationships between intrusion prevention rules, display the detected anomaly rule on a screen, and then inspect the intrusion prevention rules in a firewall policy.

Another object of the present invention is to detect an anomaly rule as one of a shadowing anomaly, a redundancy anomaly, a correlation anomaly, and a generalization anomaly in relationships between intrusion prevention rules, thus enabling intrusion prevention rules in a firewall policy to be more easily inspected.

A further object of the present invention is to indicate an anomaly rule in the colors of figures preset depending on the level of risk, thus enabling intrusion prevention rules in a firewall policy to be more easily inspected.

Yet another object of the present invention is to display intrusion prevention rules other than an anomaly rule on a screen, thus enabling the intrusion prevention rules in a firewall policy to be more easily inspected.

In accordance with an aspect of the present invention to accomplish the above objects, there is provided a firewall policy inspection apparatus including an intrusion prevention rule obtainment unit for obtaining intrusion prevention rules from a target firewall policy; an anomaly rule detection unit for detecting an anomaly rule in a relationship between the intrusion prevention rules; and a screen display unit for displaying art anomaly rule graph on a screen using results of the detection.

Preferably, the intrusion prevention rule obtainment unit may obtain a protocol, a source Internet Protocol (IP) address, a source port, a destination IP address, a destination port, a policy action, and a rule sequence that are components of the intrusion prevention rules.

Preferably, the anomaly rule detection unit may detect any one of a shadowing anomaly, a redundancy anomaly, a correlation anomaly, and a generalization anomaly in the relationship between the intrusion prevention rules.

Preferably, the screen display unit may be configured to, if the anomaly rule is detected in a relationship between a first intrusion prevention rule and a second intrusion prevention rule, display an anomaly rule graph in which a number of the first intrusion prevention rule, the detected anomaly rule, and a number of the second intrusion prevention rule are sequentially connected.

Preferably, the screen display unit may further display an intrusion prevention rule graph in which the source IP address, the destination port, and the destination IP address are sequentially connected.

Preferably, the screen display unit may be configured to, when displaying the number of the first intrusion prevention rule, the number of the second intrusion prevention rule, the anomaly rule, the source IP address, the destination IP address, and the destination port in a form of graphs, indicate components of the graphs in shapes of figures preset depending on the components.

Preferably, the screen display unit may be configured to, when displaying the number of the first intrusion prevention rule, the number of the second intrusion prevention rule, the source IP address, and the destination IP address in a form of graphs, indicate components of the graphs in colors of figures preset depending on a level of importance, and when displaying the anomaly rule and the destination port in a form of graphs, indicate components of the graphs in colors of figures preset depending on one or more of a level of importance and a level of risk.

Preferably, the screen display unit may be configured to, if a user input for selecting a graph node corresponding to any one of the number of the first intrusion prevention rule, the number of the second intrusion prevention rule, the anomaly rule, the source IP address, the destination IP address, and the destination port is received, update the screen in correspondence with the selected graph node.

Preferably, the screen display unit may be configured to, if a user input for selecting the destination IP address is received, update the screen to an intrusion prevention rule graph in which the selected destination IP address is used as a source IP address.

Preferably, the screen display unit may be configured to, if a user input for selecting the anomaly rule is received, update the screen to an anomaly rule graph including intrusion prevention rules in which the selected anomaly rule is detected.

In accordance with another aspect of the present invention to accomplish the above objects, there is provided a firewall policy inspection method including obtaining intrusion prevention rules from a target firewall policy; detecting an anomaly rule in a relationship between the intrusion prevention rules; and displaying an anomaly rule graph on a screen using results of the detection.

Preferably, obtaining the intrusion prevention rules may be configured to obtain a protocol, a source Internet Protocol (IP) address, a source port, a destination IP address, a destination port, a policy action, and a rule sequence that are components of the intrusion prevention rules.

Preferably, detecting the anomaly rule may be configured to detect any one of a shadowing anomaly, a redundancy anomaly, a correlation anomaly, and a generalization anomaly in the relationship between the intrusion prevention rules.

Preferably, displaying on the screen may be configured to, if the anomaly role is detected in a relationship between a first intrusion prevention rule and a second intrusion prevention rule, display an anomaly rule graph in which a number of the first intrusion prevention rule, the detected anomaly rule, and a number of the second intrusion prevention rule are sequentially connected.

Preferably, displaying on the screen may be configured to further display an intrusion prevention rule graph in which the source IP address, the destination port, and the destination IP address are sequentially connected.

Preferably, displaying on the screen may be configured to, when displaying the number of the first intrusion prevention rule, the number of the second intrusion prevention rule, the anomaly rule, the source IP address, the destination IP address, and the destination port in a form of graphs, indicate components of the graphs in shapes of figures preset depending on the components.

Preferably, displaying on the screen may be configured to, when displaying the number of the first intrusion prevention rule, the number of the second intrusion prevention rule, the source IP address, and the destination IP address in a form of graphs, indicate components of the graphs in colors of figures preset depending on a level of importance, and when displaying the anomaly rule and the destination port in a form of graphs, indicate components of the graphs in colors of figures preset depending on one or more of a level of importance and a level of risk.

Preferably, displaying on the screen may be configured to, if a user input for selecting a graph node corresponding to any one of the number of the first intrusion prevention rule, the number of the second intrusion prevention rule, the anomaly rule, the source IP address, the destination IP address, and the destination port is received, update the screen in correspondence with the selected graph node.

Preferably, displaying on the screen may be configured to, if a user input for selecting the destination IP address is received, update the screen to an intrusion prevention rule graph in which the selected destination IP address is used as a source IP address.

Preferably, displaying on the screen may be configured to, if a user input for selecting the anomaly rule is received, update the screen to an anomaly rule graph including intrusion prevention rules in which the selected anomaly rule is detected.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. In the following description, redundant descriptions and detailed descriptions of known functions and elements that may unnecessarily make the gist of the present invention obscure will be omitted. Embodiments of the present invention are provided to fully describe the present invention to those having ordinary knowledge in the art to which the present invention pertains. Accordingly, in the drawings, the shapes and sizes of elements may be exaggerated for the sake of clearer description.

Hereinafter, preferred embodiments of the present invention will be described in detail with reference to the attached drawings.

Figure 1:
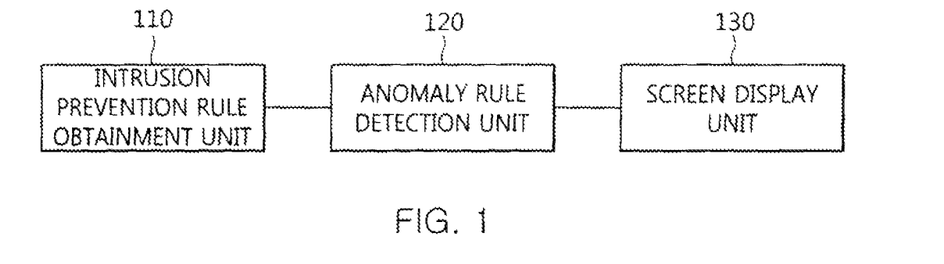
FIG. 1 is a block diagram showing a firewall policy inspection apparatus according to an embodiment of the present invention.

FIG. 1 is a block diagram showing a firewall policy inspection apparatus according to an embodiment of the present invention.

Referring to FIG. 1, the firewall policy inspection apparatus according to the embodiment of the present invention includes an intrusion prevention rule obtainment unit 110, an anomaly rule detection unit 120, and a screen display unit 130.

The intrusion prevention rule obtainment unit 110 obtains intrusion prevention rules from a target firewall policy.

In this case, the intrusion prevention rule obtainment unit 110 may obtain components of the intrusion prevention rules, that is, a protocol, a source Internet Protocol (IP) address, a source port, a destination IP address, a destination port, a policy action, and a rule sequence.

The anomaly rule detection unit 120 detects an anomaly rule 420 (see FIG. 4) in relationships between the intrusion prevention rules.

In this case, the anomaly rule detection unit 120 may detect any one of a shadowing anomaly, a redundancy anomaly, a correlation anomaly, and a generalization anomaly in relationships between the intrusion prevention rules.

The screen display unit 130 displays an anomaly rule graph on the screen using the results of the detection.

In this case, if an anomaly rule 420 is detected in a relationship between a first intrusion prevention rule and a second intrusion prevention rule, the screen display unit 130 may display an anomaly rule graph in which the number of the first intrusion prevention rule, the number of the detected anomaly rule 420, and the number of the second intrusion prevention rule are sequentially connected.

Figure 2:
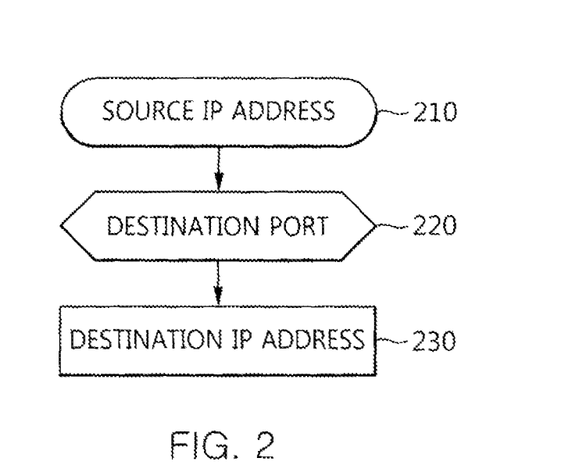
FIG. 2 is a diagram showing an example of a unit intrusion prevention rule graph according to the present invention.

Here, referring to FIG. 2, the screen display unit 130 may further display an intrusion prevention rule graph in which a source IP address 210, a destination port 220, and a destination IP address 230 are sequentially connected.

Figure 4:
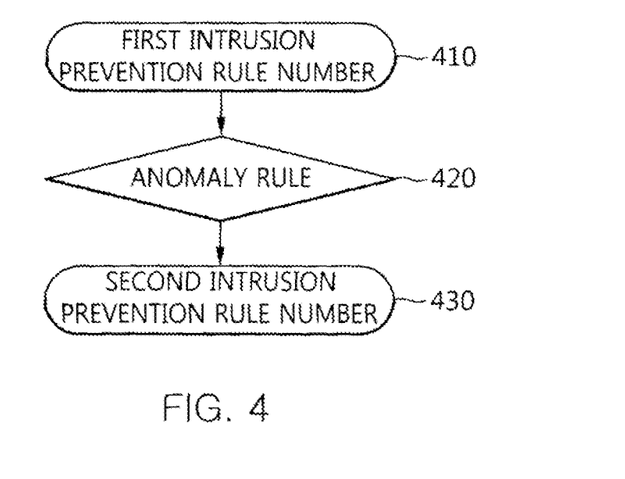
FIG. 4 is a diagram showing an example of a unit anomaly rule graph according to the present invention.

Here, referring to FIGS. 2 and 4, upon displaying intrusion prevention rule numbers 410 and 430, the anomaly rule 420, the source IP address 210, the destination IP address 230, and the destination port 220 in the form of graphs, the screen display unit 130 may indicate the components of the graphs in the shapes of figures preset depending on the components.

In this case, upon displaying the intrusion prevention rule numbers 410 and 430, the source IP address 210, and the destination IP address 230 in the form of graphs, the screen display unit 130 indicates the components of the graphs in the colors of figures preset depending on the level of importance. Further, upon displaying the anomaly rule 420 and the destination port 220 in the form of graphs, the screen display unit 130 may indicate the components of the graphs in the colors of figures preset depending on one or more of the level of importance and the level of risk.

In this case, if a user input for selecting a graph node corresponding to any one of the intrusion prevention rule numbers 410 and 430, the anomaly role 420, the source IP address 210, the destination IP address 230, and the destination port 220 is received, the screen display unit 130 may update the screen in correspondence with the selected graph node.

Further, if a user input for selecting a destination IP address 230 is received, the screen display unit 130 may update the screen to an intrusion prevention rule graph in which the selected destination IP address 230 is used as a source IP address 210.

Furthermore, if a user input for selecting a destination port 220 is received, the screen display unit 130 may update the screen to an intrusion prevention rule graph which includes a source IP address 210 and a destination IP address 230 connected to the selected destination port 220.

Furthermore, if a user input for selecting a source IP address 210 is received, the screen display unit 130 may update the screen to an intrusion prevention rule graph in which the selected source IP address 210 is used as a destination IP address 230.

In this way, the screen display unit 130 may update the screen to the intrusion prevention rule graph preset depending on the selected graph node.

If a user input for selecting an anomaly rule 420 is received, the screen display unit 130 may update the screen to an anomaly rule graph which includes intrusion prevention rules in which the selected anomaly rule 420 is detected.

Furthermore, if a user input for selecting a first intrusion prevention rule number 410 is received, the screen display unit 130 may update the screen to an anomaly rule graph which includes an anomaly rule 420 detected for the selected first intrusion prevention rule number 410.

Furthermore, if a user input for selecting a second intrusion prevention rule number 430 is received, the screen display unit 130 may update the screen to an anomaly rule graph which includes an anomaly rule 420 detected for the selected second intrusion prevention rule number 430.

In this way, the screen display unit 130 may update the screen to the corresponding anomaly rule graph preset depending on the selected graph node.

FIG. 2 is a diagram showing an example of a unit intrusion prevention rule graph according to the present invention.

Referring to FIG. 2, the unit intrusion prevention rule graph according to the present invention includes a single source IP address 210, a single destination port 220, and a single destination IP address 230.

In this case, the screen display unit 130 may display the unit intrusion prevention rule graph in which the source IP address 210, the destination port 220, and the destination IP address 230 are sequentially connected.

When displaying the source IP address 210, destination IP address 230, and the destination port 220 in the form of a graph, the screen display unit 130 may indicate the components of the graph in the shapes of figures preset depending on the components.

For example, the screen display unit 130 may display the graph in the shapes of figures shown in FIG. 2 when the source IP address 210 is set to a figure having rounded both ends, the destination port 220 is set to a figure having pointed both ends, and the destination IP address 230 is set to a rectangle.

Although not shown in FIG. 2, when displaying the source IP address 210 and the destination IP address 230 in the form of a graph, the screen display unit 130 may indicate the components of the graph in the colors of figures preset depending on the level of importance, and when displaying the destination port 220 in the form of a graph, the screen display unit 130 may indicate the component of the graph in the color of a figure preset depending on one or more of the level of importance and the level of risk.

Figure 3:
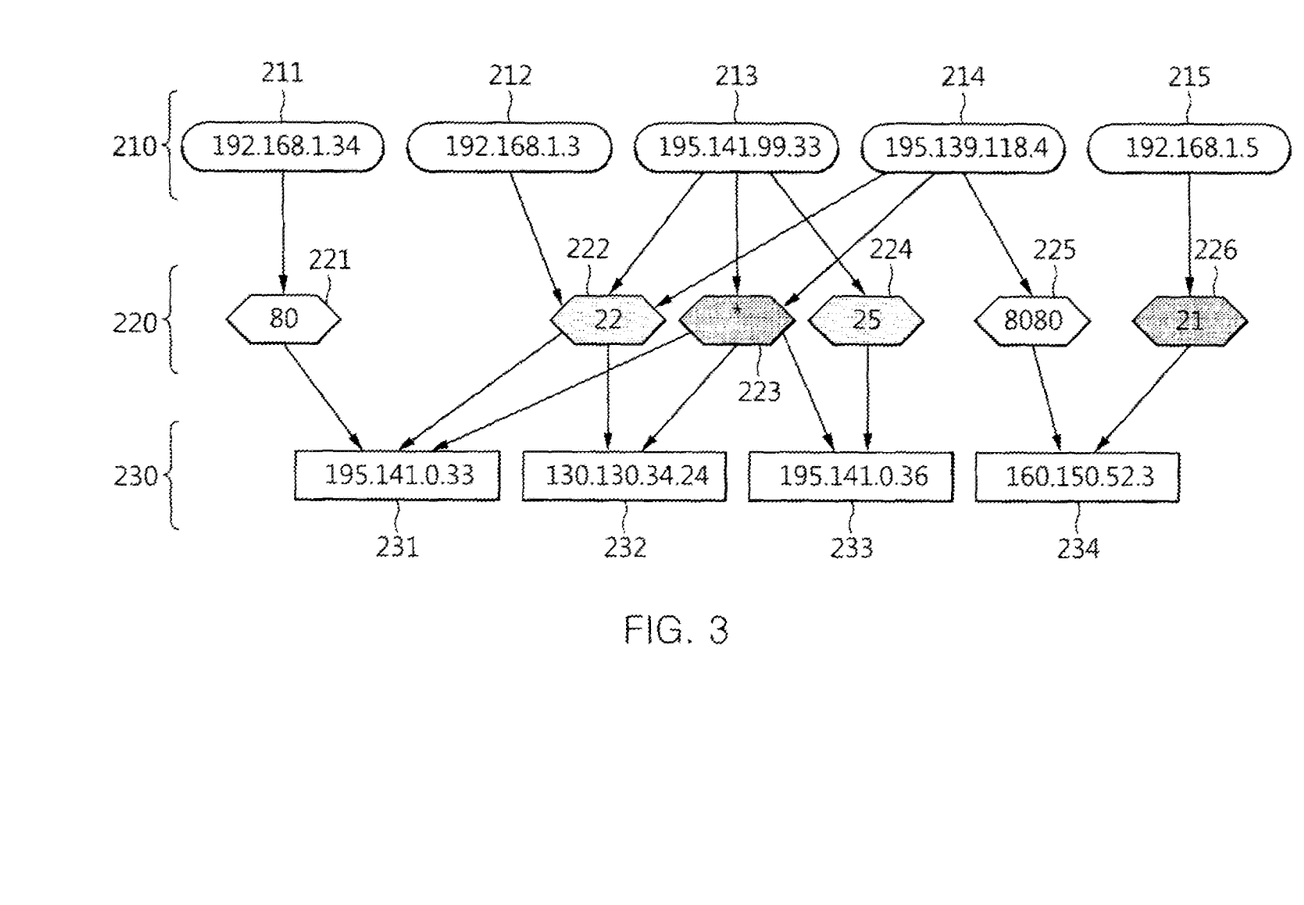
FIG. 3 is a diagram showing an example of an intrusion prevention rule graph according to the present invention.

FIG. 3 is a diagram showing an example of an intrusion prevention rule graph according to the present invention.

Referring to FIG. 3, the intrusion prevention rule graph according to the present invention includes a plurality of source IP addresses 211 to 215 (210), a plurality of destination ports 221 to 226 (220), and a plurality of destination IP addresses 231 to 234 (230).

In this case, the screen display unit 130 may display an intrusion prevention rule graph in which source IP addresses 210, destination ports 220, and destination IP addresses 230 are sequentially connected.

For example, when the first source IP address 211 is 192.168.1.34, the first destination port 221 is 80, and the first destination IP address 231 is 195.141.0.33, the screen display unit 130 may display an intrusion prevention rule in which a policy action is 'accept' in the form of an intrusion prevention rule graph in which the first source IP address 211, the first destination port 221, and the first destination IP address 231 are sequentially connected.

In this case, when displaying the source IP addresses 210, the destination IP addresses 230, and the destination ports 220 in the form of a graph, the screen display unit 130 may indicate the components of the graph in the shapes of figures preset depending on the components.

For example, the screen display unit 130 may display the graph in the shapes of figures shown in FIG. 3 when each source IP address 210 is set to a figure having rounded both ends, each destination port 220 is set to a figure having pointed both ends, and each destination IP address 230 is set to a rectangle.

In this ease, when displaying the source IP address 210 and the destination IP address 230 in the form of a graph, the screen display unit 130 may indicate the components of the graph in the colors of figures preset depending on the level of importance, and when displaying the destination port 220 in the form of a graph, the screen display unit 130 may indicate the component of the graph in the color of a figure preset depending on one or more of the level of importance and the level of risk.

For example, when displaying the destination port 220 in the form of a graph, the screen display unit 130 may indicate the destination port in the color of a figure set to white if the level of risk indicates 'no danger,' to yellow if the level of risk indicates 'caution,' and to red if the level of risk indicates 'danger.'

Accordingly, when the first destination port 221 does not have the level of risk, the second destination port 222 has the level of risk corresponding to 'caution', and the third destination port 223 has the level of risk corresponding to 'danger,' the screen display unit 130 may indicate the first destination port 221 in white, the second destination port 222 in yellow, and the third destination port 223 in red.

FIG. 4 is a diagram showing an example of a unit anomaly rule graph according to the present invention.

Referring to FIG. 4, the unit anomaly rule graph according to the present invention includes two intrusion prevention rule numbers 410 and 430 and a single anomaly rule 420.

In this case, when an anomaly rule 420 is detected in a relationship between a first intrusion prevention rule and a second intrusion prevention rule, the screen display unit 130 may display a unit anomaly rule graph in which the first intrusion prevention rule number 410, the detected anomaly rule 420, and the second intrusion prevention rule number 430 are sequentially connected.

In this case, when displaying the first intrusion prevention rule number 410, the anomaly rule 420, and the second intrusion prevention rule number 430 in the form of a graph, the screen display unit 130 may indicate the components of the graph in the shapes of figures preset depending on the components.

For example, the screen display unit 130 may display the graph in the shapes of figures shown in FIG. 4 when each of the intrusion prevention rule numbers 410 and 430 is set to a figure having rounded both ends and the anomaly rule 420 is set to a diamond shape.

Although not shown in FIG. 4, when displaying the intrusion prevention rule numbers 410 and 430 in the form of a graph, the screen display unit 130 may indicate the components of the graph in the colors of figures preset depending on the level of importance, and when displaying the anomaly rule 420 in the form of a graph, the screen display unit 130 may indicate the component of the graph in the colors of figures preset depending on one or more of the level of importance and the level of risk.

Figure 5:
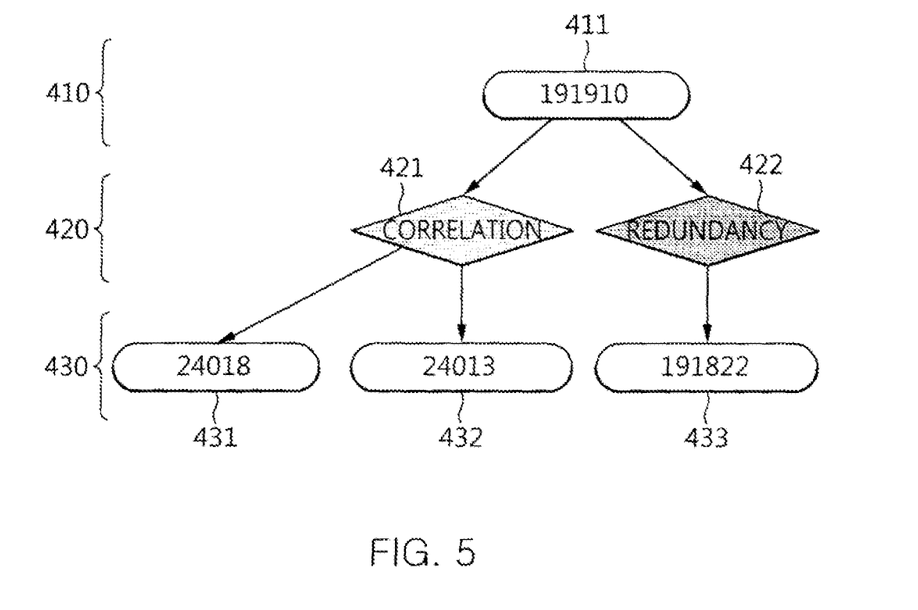
FIG. 5 is a diagram showing an example of an anomaly rule graph according to the present invention.

FIG. 5 is a diagram showing an example of an anomaly rule graph according to the present invention.

Referring to FIG. 5, the anomaly rule graph according to the present invention includes a plurality of intrusion prevention rule numbers 411 (410) and 431 to 433 (430) and anomaly rules 421 and 422 (420).

In this case, when the anomaly rules 420 are detected in relationships between the first intrusion prevention rule and the second intrusion prevention rules, the screen display unit 130 may display an anomaly rule graph in which the first intrusion prevention rule number 410, the detected anomaly rules 420, and the second intrusion prevention rule numbers 430 are sequentially connected.

For example, when the first intrusion prevention rule number 410 is 191910 (411), the second intrusion prevention rule number 430 is 24018 (431), and a correlation anomaly 421 is detected between the first intrusion prevention rule and the second intrusion prevention rule, the screen display unit 130 may display an anomaly rule graph in which 91910 (411), the correlation anomaly 421, and 24018 (431) are sequentially connected.

In this case, when displaying the intrusion prevention rule numbers 411 and 431 to 433 and the anomaly rules 421 and 422 in the form of a graph, the screen display unit 130 may indicate the components of the graph in the shapes of figures preset depending on the components.

For example, the screen display unit 130 may indicate the components of the graph in the shapes of figures shown in FIG. 5 when each of the intrusion prevention rule numbers 411 and 431 to 433 is set to a figure having rounded both ends, and each of the anomaly rules 421 and 422 is set to a diamond shape.

In this case, when displaying the plurality of intrusion prevention rule numbers 411 and 431 to 433 in the form of the graph, the screen display unit 130 may indicate the components of the graph in colors of figures preset depending on the level of importance, and when displaying the anomaly rules 421 and 422 in the form of the graph, the screen display unit 130 may indicate the components of the graph in colors of figures preset depending on one or more of the level of importance and the level of risk.

For example, when displaying the anomaly rules 421 and 422 in the form of a graph, the screen display unit 130 may indicate each anomaly rule in the color of a figure set to white if the level of risk indicates 'no danger,' to yellow if the level of risk indicates 'caution,' and to red if the level of risk indicates 'danger.'

Accordingly, when the level of risk of the correlation anomaly 421 indicates 'caution,' and the level of risk of the redundancy anomaly 422 indicates 'danger,' the screen display unit 130 may indicate the correlation anomaly 421 in yellow, and the redundancy anomaly 422 in red.

Figure 6:
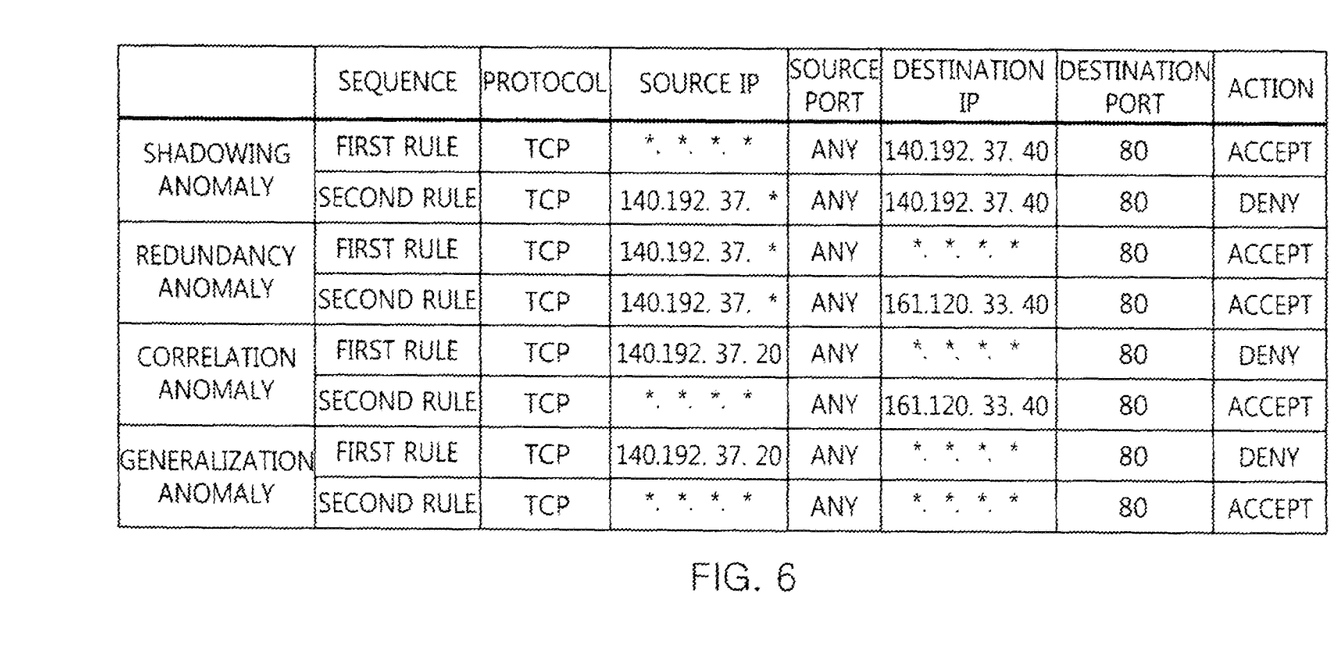
FIG. 6 is a diagram showing examples of the type of anomaly rule according to the present invention.

FIG. 6 is a diagram showing examples of the type of anomaly rule 420 according to the present invention.

Referring to FIG. 6, it can be seen that the anomaly rule 420 according to the present invention has four types, that is, a shadowing anomaly, a redundancy anomaly, a correlation anomaly, and a generalization anomaly.

In this case, the anomaly rule detection unit 120 may detect any one of the shadowing anomaly, the redundancy anomaly, the correlation anomaly, and the generalization anomaly in relationships between the intrusion prevention rules.

The shadowing anomaly has the sequence of a first rule and a second rule, and indicates a case where one of the source IP address 210, the source port, the destination IP address 230, and the destination port 220 of the second rule is a subset of that of the first rule, and where the policy actions of the second rule and the first rule are contrary to each other.

For example, when the source IP address (210) 140.192.37.* of the second rule is a subset of the source IP address (210) *.*.*.* of the first rule and, in addition, the policy action of the second rule is 'deny,' and the policy action of the first rule is 'accept,' the policy actions of the second rule and the first rule are contrary to each other, and thus this anomaly corresponds to the shadowing anomaly.

The redundancy anomaly has the sequence of a first rule and a second rule, and indicates a case where one of the source IP address 210, the source port, the destination IP address 230, and the destination port 220 of the second rule is a subset of that of the first rule, and the policy actions of the second rule and the first rule are identical to each other.

For example, when the destination IP address (230) 161.120.33.40 of the second rule is a subset of the destination IP address (230) *.*.*.* of the first rule and, in addition, the policy action of the second rule is 'accept,' and the policy action of the first rule is 'accept,' the policy actions of the second rule and the first rule are identical to each other, and thus this anomaly corresponds to the redundancy anomaly.

The correlation anomaly has the sequence of a first rule and a second rule, and indicates a case where any one of the source IP address 210, the source port, the destination IP address 230, and the destination port 220 of the second rule is a subset of that of the first rule, another one of the aforementioned of the second rule is a superset of that of the first rule, and the policy actions of the second rule and the first rule are contrary to each other.

For example, when the destination IP address (230) 161.120.33.40 of the second rule is a subset of the destination IP address (230) *.*.*.* of the first rule, and the source IP address (210) *.*.*.* of the second rule is a superset of the source IP address (210) 140.192.37.20 of the first rule and, in addition, the policy action of the second rule is 'accept' and the policy action of the first rule is 'deny,' the policy actions of the second rule and the first rule are contrary to each other, and thus this anomaly corresponds to the correlation anomaly.

The generalization anomaly has the sequence of a first rule and a second rule, and indicates a case where any one of the source IP address 210, the source port, the destination IP address 230, and the destination port 220 of the second rule is a superset of that of the first rule, and the policy actions of the second rule and the first rule are contrary to each other.

For example, when the source IP address (210) *.*.*.* of the second rule is a superset of the source IP address (210) 140.192.37.20 of the first rule and, in addition, the policy action of the second rule is 'deny' and the policy action of the first rule is 'accept,' the policy actions of the second rule and the first rule are contrary to each other, and thus this anomaly corresponds to the generalization anomaly.

Although not shown in FIG. 6, when the levels of risk of the shadowing anomaly, the correlation anomaly, and the generalization anomaly indicate 'caution' and the level of risk of the redundancy anomaly indicates 'danger,' the screen display unit 130 indicates the shadowing anomaly, the correlation anomaly, and the generalization anomaly in yellow, and indicates the redundancy anomaly in red.

Figure 7:
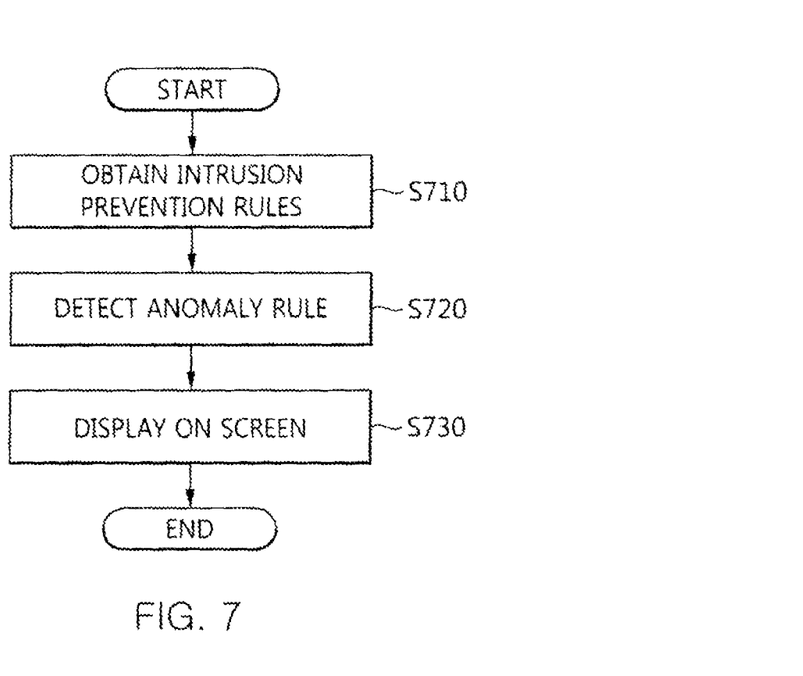
FIG. 7 is an operation flowchart showing a firewall policy inspection method according to an embodiment of the present invention.

FIG. 7 is an operation flowchart showing a firewall policy inspection method according to an embodiment of the present invention.

Referring to FIG. 7, in the firewall policy inspection method according to the embodiment of the present invention, intrusion prevention rules are obtained from a target firewall policy at step S710.

In this case, at step S710, the components of the intrusion prevention rules, that is, a protocol, a source IP address, a source port, a destination IP address, a destination port, a policy action, and a rule sequence, may be obtained.

Next, in the firewall policy inspection method according to the embodiment of the present invention, an anomaly rule 420 is detected in a relationship between the intrusion prevention rules at step S720.

Here, step S720 may be configured to detect any one of a shadowing anomaly, a redundancy anomaly, a correlation anomaly, and a generalization anomaly in the relationship between the intrusion prevention rules.

Next, in the firewall policy inspection method according to the embodiment of the present invention, an anomaly rule graph is displayed on the screen using the results of the detection at step S730.

At step S730, when the anomaly rule 420 is detected in a relationship between a first intrusion prevention rule and a second intrusion prevention rule, an anomaly rule graph in which the number of the first intrusion prevention rule, the detected anomaly rule 420, and the number of the second intrusion prevention rule are sequentially connected may be displayed.

At step S730, an intrusion prevention rule graph in which a source IP address 210, a destination port 220, and a destination IP address 230 are sequentially connected may be further displayed.

In this case, at step S730, when intrusion prevention rule numbers 410 and 430, the anomaly rule 420, the source IP address 210, the destination IP address 230, and the destination port 220 are displayed in the form of graphs, the components of the graph may be indicated in the shapes of figures preset depending on the components.

Here, step S730 may be configured to, when displaying the intrusion prevention rule numbers 410 and 430, the source IP address 210, and the destination IP address 230 in the form of graphs, indicate the components of the graphs in the colors of figures preset depending on the level of importance, and when displaying the anomaly rule 420 and the destination port 220 in the farm of graphs, indicate the components of the graphs in the colors of figures preset depending on one or more of the level of importance and the level of risk.

Further, at step S730, if a user input for selecting a destination IP address 230 is received, the screen may be updated to an intrusion prevention rule graph in which the selected destination IP address 230 is used as a source IP address 210.

Further, at step S730, if a user input for selecting a destination port 220 is received, the screen may be updated to an intrusion prevention rule graph which includes a source IP address 210 and a destination IP address 230 connected to the selected destination port 220.

Furthermore, at step S730, if a user input for selecting a source IP address 210 is received, the screen may be updated to an intrusion prevention role graph in which the selected source IP address 210 is used as a destination IP address 230.

In this way, step S730 may be configured to update the screen to the intrusion prevention rule graph preset depending on the selected graph node.

In this case, at step S730, if a user input for selecting an anomaly rule 420 is received, the screen may be updated to an anomaly rule graph which includes intrusion prevention rules in which the selected anomaly rule 420 is detected.

At step S730, if a user input for selecting a first intrusion prevention rule number 410 is received, the screen may be updated to an anomaly rule graph which includes an anomaly rule 420 detected for the selected first intrusion prevention rule number 410.

Further, at step S730, if a user input for selecting a second intrusion prevention rule number 430 is received, the screen may be updated to an anomaly rule graph which includes an anomaly rule 420 detected for the selected second intrusion prevention rule number 430.

In this way, step S730 may be configured to update the screen to the corresponding anomaly rule graph preset depending cm the selected graph node.

In accordance with the present invention, the present invention can detect an anomaly rule in relationships between intrusion prevention rules, display the detected anomaly rule on a screen, and then inspect the intrusion prevention rules in a firewall policy.

Further, the present invention can detect an anomaly rule as one of a shadowing anomaly, a redundancy anomaly, a correlation anomaly, and a generalization anomaly in relationships between intrusion prevention rules, thus enabling intrusion prevention rules in a firewall policy to be more easily inspected.

Furthermore, the present invention can indicate an anomaly rule in the colors of figures preset depending on the level of risk, thus enabling intrusion prevention rules in a firewall policy to be more easily inspected.

Furthermore, the present invention can display intrusion prevention rules other than an anomaly rule on a screen, thus enabling the intrusion prevention rules in a firewall policy to be more easily inspected.

As described above, in the firewall policy inspection apparatus and method according to the present invention, the configurations and schemes in the above-described embodiments are not limitedly applied, and some or all of the above embodiments can be selectively combined and configured so that various modifications are possible.

What is claimed is:

1. A firewall policy inspection apparatus comprising:
an intrusion prevention rule obtainment unit for obtaining intrusion prevention rules from a target firewall policy;
an anomaly rule detection unit for detecting an anomaly rule in a relationship between the intrusion prevention rules; and
a screen display unit for displaying an anomaly rule graph on a screen using results of the detection,
wherein the intrusion prevention rule obtainment unit obtains a protocol, a source Internet Protocol (IP) address, a source port, a destination IP address, a destination port, a policy action, and a rule sequence that are components of the intrusion prevention rules,
wherein the screen display unit is configured to, if the anomaly rule is detected in a relationship between a first intrusion prevention rule and a second intrusion prevention rule, display an anomaly rule graph in which a number of the first intrusion prevention rule, the detected anomaly rule, and a number of the second intrusion prevention rule are sequentially connected,
wherein the screen display unit further displays an intrusion prevention rule graph in which the source IP address, the destination port, and the destination IP address are sequentially connected, and
wherein the screen display unit is configured to, if a user input for selecting a graph node corresponding to any one of the number of the first intrusion prevention rule, the number of die second intrusion prevention rule, the anomaly rule, the source IP address, the destination IP address, and the destination port is received, update the screen in correspondence with the selected graph node.

2. The firewall policy inspection apparatus of claim 1, wherein the anomaly rule detection unit detects any one of a shadowing anomaly, a redundancy anomaly, a correlation anomaly, and a generalization anomaly in the relationship between the intrusion prevention rules.

3. The firewall policy inspection apparatus of claim 2, wherein the screen display unit is configured to, when displaying the number of the first intrusion prevention rule, the number of the second intrusion prevention rule, the anomaly rule, the source IP address, the destination IP address, and the destination port in a form of graphs, indicate components of the graphs in shapes of figures preset depending on the components.

4. The firewall policy inspection apparatus of claim 3, wherein the screen display unit is configured to:
when displaying the number of the first intrusion prevention rule, the number of the second intrusion prevention rule, the source IP address, and the destination IP address in a form of graphs, indicate components of the graphs in colors of figures preset depending on a level of priority, and
when displaying the anomaly rule and the destination port in a form of graphs, indicate components of the graphs in colors of figures preset depending on one or more of a level of priority and a level of risk.

5. The firewall policy inspection apparatus of claim 4, wherein the screen display unit is configured to, if a user input for selecting the destination IP address is received, update the screen to an intrusion prevention rule graph in which the selected destination IP address is used as a source IP address.

6. The firewall policy inspection apparatus of claim 5, wherein the screen display unit is configured to, if a user input for selecting the anomaly rule is received, update the screen to an anomaly rule graph including intrusion prevention rules in which the selected anomaly rule is detected.

7. A firewall policy inspection method comprising:
obtaining intrusion prevention rules from a target firewall policy;
detecting an anomaly rule in a relationship between the intrusion prevention rules; and
displaying an anomaly rule graph on a screen using results of the detection,
wherein obtaining the intrusion prevention rules is contoured to obtain a protocol, a source Internet Protocol (IP) address, a source port, a destination IP address, a destination port, a policy action, and a rule sequence that are components of the intrusion prevention rules,
wherein displaying on the screen is configured to, if the anomaly rule is detected in a relationship between a first intrusion prevention rule and a second intrusion prevention rule, display an anomaly rule graph in which a number of the first intrusion prevention rule, the detected anomaly rule, and a number of the second intrusion prevention rule are sequentially connected,
wherein displaying on the screen is configured to further display an intrusion prevention rule graph in which the source IP address, the destination port, and the destination IP address are sequentially connected, and
wherein displaying on the screen is configured to, if a user input for selecting a graph node corresponding to any one of the number of the first intrusion prevention rule, the number of the second intrusion prevention rule, the anomaly rule, the source IP address, the destination IP address, and the destination port is received, update the screen in correspondence with the selected graph node.

8. The firewall policy inspection method of claim 7, wherein detecting the anomaly rule is configured to detect any one of a shadowing anomaly, a redundancy anomaly, a correlation anomaly, and a generalization anomaly in the relationship between the intrusion prevention rules.

9. The firewall policy inspection method of claim 8, wherein displaying on the screen is configured to, when displaying the number of the first intrusion prevention rule, the number of the second intrusion prevention rule, the anomaly rule, the source IP address, the destination IP address, and the destination port in a form of graphs, indicate components of the graphs in shapes of figures preset depending on the components.

10. The firewall policy inspection method of claim 9, wherein displaying on the screen is configured to:
when displaying the number of the first intrusion prevention rule, the number of the second intrusion prevention rule, the source IP address, and the destination IP address in a form of graphs, indicate components of the graphs in colors of figures preset depending on a level of priority, and
when displaying the anomaly rule and the destination port in a form of graphs, indicate components of the graphs in colors of figures preset depending on one or more of a level of priority and a level of risk.

11. The firewall policy inspection method of claim 10, wherein displaying on the screen is configured to, if a user input for selecting the destination IP address is received, update the screen to an intrusion prevention rule graph in which the selected destination IP address is used as a source IP address.

12. The firewall policy inspection method of claim 11, wherein displaying on the screen is configured to, if a user input for selecting the anomaly rule is received, update the screen to an anomaly rule graph including intrusion prevention rules in which the selected anomaly rule is detected.

* * * * *